United States Patent
Rao et al.

(10) Patent No.: US 11,874,146 B1
(45) Date of Patent: Jan. 16, 2024

(54) DISTRIBUTED ACOUSTIC SENSING SYSTEM BASED ON RANDOM LASER AMPLIFICATION AND SCATTERING ENHANCED OPTICAL FIBER

(71) Applicant: ZHEJIANG LAB, Zhejiang (CN)

(72) Inventors: Yunjiang Rao, Hangzhou (CN); Bing Han, Hangzhou (CN); Yang Liu, Hangzhou (CN); Shisheng Dong, Hangzhou (CN); Lingmei Ma, Hangzhou (CN); Caiyun Li, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/328,799

(22) Filed: Jun. 5, 2023

(30) Foreign Application Priority Data

Oct. 9, 2022 (CN) .......................... 202211226269.2

(51) Int. Cl.
*G01H 9/00* (2006.01)
*G01D 5/353* (2006.01)

(52) U.S. Cl.
CPC .......... *G01D 5/35361* (2013.01); *G01H 9/004* (2013.01)

(58) Field of Classification Search
None
See application file for complete search history.

(56) References Cited

U.S. PATENT DOCUMENTS

| 2007/0258132 A1* | 11/2007 | Zhou | H04B 10/2916 |
| | | | 359/334 |
| 2014/0208855 A1* | 7/2014 | Skinner | G01H 9/00 |
| | | | 73/655 |
| 2022/0137595 A1 | 5/2022 | Xia et al. | |

FOREIGN PATENT DOCUMENTS

| CN | 102354900 A | 2/2012 |
| CN | 103376120 A | 10/2013 |
| CN | 107271027 A | 10/2017 |

(Continued)

OTHER PUBLICATIONS

Notice Of Allowance(CN202211226269.2); dated Nov. 18, 2022.

(Continued)

*Primary Examiner* — Brandi N Hopkins
*Assistant Examiner* — Nigel H Plumb
(74) *Attorney, Agent, or Firm* — W&G Law Group

(57) ABSTRACT

A distributed acoustic sensing (DAS) system based on random fiber lasing amplification (RFLA) and a Rayleigh scattering enhanced fiber (RSEF), and relates to the field of distributed optical fiber sensing. The system comprises a DAS demodulation unit, a high-order RFLA unit and a RSEF. The present disclosure adopt the high-order RFLA technology to replace the traditional high-order distributed Raman amplification technology, and it does not need to use a plurality of pumps with different wavelength, and only needs a high-order random fiber laser pump and a broadband reflector to provide feedback for cascaded random fiber lasings to perform distributed amplification on signal light.

(Continued)

By using high-order RFLA combined with the RSEF, high-efficiency and low-threshold RFLA can be achieved, and the signal-to-noise ratio and performances of a DAS system can be further improved, which enables realization of long-distance and high-performance distributed acoustic sensing.

10 Claims, 3 Drawing Sheets

(56) References Cited

FOREIGN PATENT DOCUMENTS

| CN | 108303197 | A | 7/2018 |
|---|---|---|---|
| CN | 109489801 | A | 3/2019 |
| CN | 109632076 | A | 4/2019 |
| CN | 110375842 | A | 10/2019 |
| CN | 112038878 | A | 12/2020 |
| CN | 112186481 | A | 1/2021 |
| CN | 216899218 | U | 7/2022 |
| CN | 114927933 | A | 8/2022 |
| CN | 114976838 | A | 8/2022 |
| KR | 102330484 | B1 | 11/2021 |

OTHER PUBLICATIONS

Desing-and-implementation-for-Ultra-long-distance-multi-point-sensing-system-based-on-random-fiber-laser.
Random-laser-and-stimulated-Raman-scattering-in-compressible-porous-polymeric-foam.
Recent-Advances-in-Long-distance-FBG-Sensor-Systems-at-UESTC.
Recent-progress-in-ultra--long-distributed-fiber-optic-sensing.
Research-advances-of-random-fiber-lasers-and-its-applications.
Research-Progress-of-Distributed-Acoustic-Sensing-Based-on-Scattering-Enhanced-Optical-Fiber.
Single-longitudinal-mode-Brillouin-random-fiber-laser-with-high-linewidth-compression-ratio-and-laser-efficiency-based-on-distributed-intrinsic-feedback-mechanism.
Temporally-Stable-Random-Fiber Laser-Operates-at-1070 nm.

* cited by examiner

DISTRIBUTED ACOUSTIC SENSING SYSTEM BASED ON RANDOM LASER AMPLIFICATION AND SCATTERING ENHANCED OPTICAL FIBER

CROSS-REFERENCE TO RELATED APPLICATIONS

The present application claims priority to Chinese Patent Application No. 202211226269.2, filed on Oct. 9, 2022, the content of which is incorporated herein by reference in its entirety.

TECHNICAL FIELD

The present disclosure relates to the field of optical fiber distributed sensing, in particular to a distributed acoustic sensing system based on random fiber lasing amplification (RFLA) and a Rayleigh scattering enhanced fiber (RSEF).

BACKGROUND

The optical fiber distributed acoustic sensing (DAS) technology is based on the principles of phase-sensitive optical time-domain reflectometry (Φ-OTDR), coherent optical time-domain reflectometry (COTDR), or optical frequency-domain reflectometry (OFDR), and the external acoustic perturbation can be located and quantitatively restored by demodulating the phase or frequency of the Rayleigh backscattered signal light in the optical fiber. As the mainstream development direction in the field of optical fiber sensing, the DAS technology has the outstanding characteristics of high reliability, high sensitivity, large dynamic range, high acquisition density, high acquisition efficiency, low cost, easy deployment, high temperature, high pressure resistance, anti-electromagnetic interference and so on. It has become a new generation of acoustic sensing technology, and has been widely used in many fields such as perimeter security monitoring, oil and gas exploration and development, pipeline safety monitoring, submarine seismic monitoring and so on, which is bringing revolutionary changes to these fields.

In practical applications such as border security monitoring, oil and gas pipeline safety monitoring and submarine earthquake monitoring, the long-distance and high-performance unrepeatered distributed optical fiber sensing technology is extremely important. However, on the one hand, the sensing performance of the existing long-distance DAS technology is still limited due to the accumulation of optical fiber transmission loss; on the other hand, the sensing performance of long-distance DAS system based on standard single-mode fiber (SSMF) is seriously limited because of the weak power of Rayleigh backscattering signal. Finally, the DAS signal is limited by nonlinear effect in the amplification process, and the gain provided by the first-order pump light to the signal light is limited, which leads to limited sensing performances.

SUMMARY

The object of the embodiment of the present disclosure is to provide a distributed acoustic sensing system based on random fiber lasing amplification (RFLA) and a Rayleigh scattering enhanced fiber (RSEF), so as to solve the technical problem of limited sensing performances caused by the weak power of Rayleigh backscattering signal of the DAS system in long-distance sensing application in related technologies.

According to a first aspect of the embodiment of the present disclosure, a DAS system based on random fiber lasing amplification (RFLA) and a scattering enhanced optical fiber is provided, including: a DAS demodulation unit, a high-order RFLA unit and a Rayleigh scattering enhanced fiber (RSEF). In an embodiment, the high-order RFLA unit includes a high-order random fiber laser (HRFL), an adjustable attenuator, a reflector and a wavelength division multiplexer (WDM); pulsed light output by the DAS demodulation unit is injected into the Rayleigh scattering enhanced fiber (RSEF) by a reflection port of the WDM as probe light; after pump light output by the high-order RFL is injected into the Rayleigh scattering enhanced fiber (RSEF) by a pass port of the WDM, the HRFL and the reflector form a pumping structure in the Rayleigh scattering enhanced fiber (RSEF), and cascaded random fiber lasings are generated by the combined action of stimulated Raman scattering gain and distributed backward feedback; the generated cascaded random fiber lasing is configured as a direct pump to perform distributed amplification on the pulsed light, and enhanced backscattered signal light generated by the amplified pulsed light is returned to the DAS demodulation unit; the enhanced backscattered signal light is demodulated to implement long-distance distributed acoustic sensing with a high signal-to-noise ratio.

Further, the DAS demodulation unit demodulates the enhanced backscattered signal light by Φ-OTDR, COTDR or OFDR demodulation principle.

Further, the Rayleigh scattering enhanced fiber (RSEF) adopts a continuous or discrete femtosecond laser writing method to realize scattering enhancement in full wavelength band, or adopts a continuous or discrete fiber Bragg grating (FBG) writing method to realize specific-band scattering enhancement.

Further, an output power of the HRFL is >500 mW, and a relative intensity noise of the HRFL is <−115 dB/Hz.

Further, the HRFL combined with the adjustable attenuator can realize any adjustable output of a pump power.

Further, the reflector can be a single or multiple FBGs, or a broadband reflector is used to provide feedback for cascaded Stokes light.

Further, the Rayleigh scattering enhanced fiber (RSEF) is made based on a SSMF, a few-mode fiber (FMF), an ultra-low-loss fiber (ULLF) or an ultra-low-loss large-effective-area fiber (ULL-LEAF).

Further, the DAS demodulation unit, the high-order RFLA unit and the Rayleigh scattering enhanced fiber (RSEF) are connected in sequence, and the DAS demodulation unit outputs the pulsed light, which is injected into the Rayleigh scattering enhanced fiber (RSEF) by the WDM; the HRFL outputs the pump light into the WDM by the adjustable attenuator to be injected into the Rayleigh scattering enhanced fiber (RSEF); when a power of the HRFL adjusted by the adjustable attenuator reaches a cascaded random fiber lasing threshold, the HRFL and the reflector form a forward-pumped structure, and the cascaded random fiber lasings are generated in the scattering enhanced sensing fiber by the combined action of stimulated Raman scattering gain, distributed backward feedback and point feedback provided by the reflector; the cascaded random fiber lasing in a wavelength band of 1420 nm-1490 nm is used as a direct pump to perform distributed amplification on the pulsed light in a link of the Rayleigh scattering enhanced fiber (RSEF), and the enhanced backscattered signal light generated by the amplified pulsed light is returned to the DAS demodulation unit; the DAS demodulation unit demodulates the backscattered signal light to implement long-distance distributed acoustic sensing.

Further, the DAS demodulation unit, the Rayleigh scattering enhanced fiber (RSEF) and the high-order RFLA unit are connected in sequence, and the pulsed light output by the DAS demodulation unit is directly injected into the Rayleigh scattering enhanced fiber (RSEF); the HRFL outputs high-order random fiber lasing into the WDM by the adjustable attenuator to be injected into a far end of the Rayleigh scattering enhanced fiber (RSEF); when the power of the HRFL adjusted by the adjustable attenuator reaches the cascaded random fiber lasing threshold, the HRFL and the reflector form a backward-pumped structure, and the cascaded random fiber lasings are generated in the scattering enhanced sensing fiber by the combined action of stimulated Raman scattering gain, distributed backward feedback and point feedback provided by the reflector; the cascaded random fiber lasing in a wavelength band of 1420 nm-1490 nm is used as a direct pump to perform distributed amplification on the pulsed light in the link of the Rayleigh scattering enhanced fiber (RSEF), and the enhanced backscattered signal light generated by the amplified pulsed light is returned to the DAS demodulation unit; the DAS demodulation unit demodulates the backscattered signal light to implement long-distance distributed acoustic sensing.

Further, the system includes two high-order RFLA units. In an embodiment, one high-order RFLA unit is connected with a front end of the Rayleigh scattering enhanced fiber (RSEF), while the other high-order RFLA unit is connected with the far end; the pulsed light output by the DAS demodulation unit is injected into the Rayleigh scattering enhanced fiber (RSEF) by the WDM; two HRFLs output high-order random fiber lasing into corresponding WDMs by corresponding adjustable attenuators, respectively, so as to be injected into the front end and the far end of the Rayleigh scattering enhanced fiber (RSEF), respectively; when the power of the HRFL adjusted by the adjustable attenuator reaches the cascaded random fiber lasing threshold, the HRFL and the reflector form forward-and-backward-pumped structures, and the cascaded random fiber lasings are generated in the Rayleigh scattering enhanced fiber (RSEF) by the combined action of stimulated Raman scattering gain, distributed backward feedback and point feedback provided by the reflectors; the cascaded random fiber lasings in a wavelength band of 1420 nm-1490 nm are used as direct pumps to perform distributed amplification on the pulsed light in the link of the Rayleigh scattering enhanced fiber (RSEF), and the enhanced backscattered signal light generated by the amplified pulsed light is returned to the DAS demodulation unit; the DAS demodulation unit demodulates the backscattered signal light to implement long-distance distributed acoustic sensing.

The technical solution provided by the embodiment of the present disclosure can include the following beneficial effects:

As can be seen from the above embodiments, the present disclosure adopts high-order RFLA technology instead of high-order distributed Raman amplification technology, which overcomes the problems of high system complexity and cost caused by the traditional high-order distributed Raman amplification technology requiring multiple pump lasers with different wavelengths or multiple pairs of FBGs with special center wavelengths. Without using multiple pump lasers with different wavelengths, only one HRFL and a reflector provide feedback for cascaded random fiber lasing generation are needed to perform distributed RFLA on signal light, thus achieving a long-distance DAS system with simpler structure and lower cost. By using a HRFL instead of a traditional Raman fiber laser as amplification pump source overcomes the problem that the large temporal intensity noise caused by longitudinal mode beating of traditional Raman fiber laser will deteriorate the signal light quality in the amplification process. Because of the inherent characteristics of RFL such as modeless property and low noise, the relative intensity noise of the signal light is smaller after amplification, and a DAS system with longer sensing distance and higher signal-to-noise ratio can be realized.

It should be understood that the above general description and the following detailed description are exemplary and explanatory only, and do not limit the present disclosure.

BRIEF DESCRIPTION OF DRAWINGS

The drawings herein are incorporated into and constitute a part of the specification, illustrate embodiments consistent with the present disclosure, and together with the specification, serve to explain the principle of the present disclosure.

Figure 1:
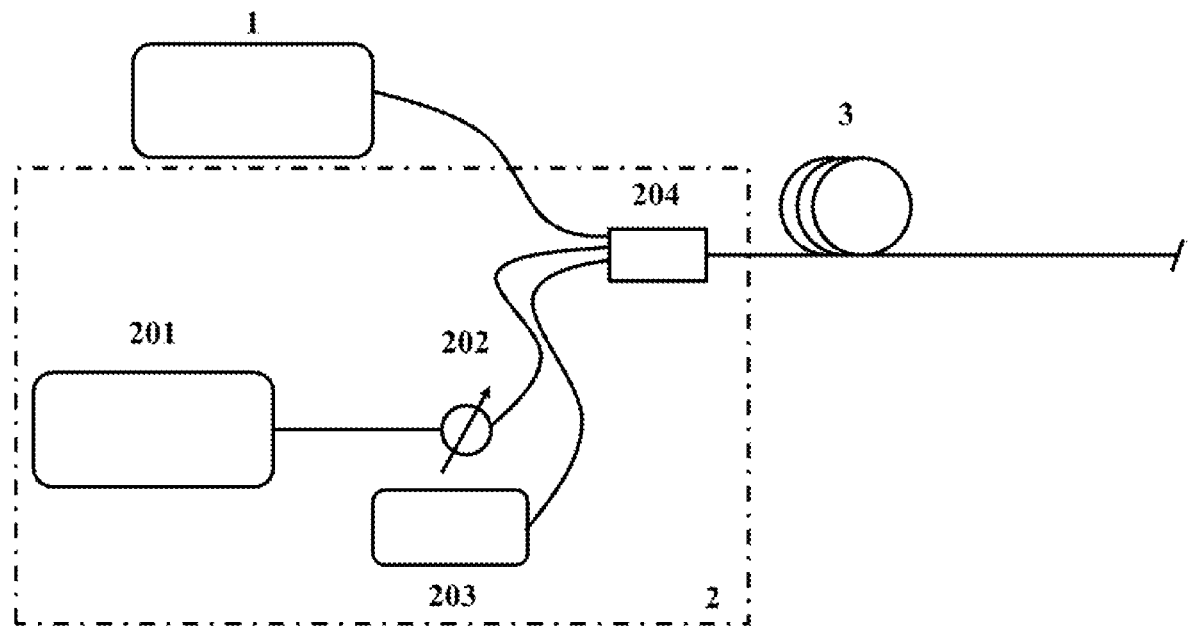
FIG. 1 is a schematic diagram of a DAS system based on forward RFLA and a RSEF according to an exemplary embodiment.

Reference signs in the figure: 1. DAS demodulation unit; 2. High-order random fiber lasing amplification (RFLA) unit; 21, HRFL; 22. Adjustable attenuator; 23. Reflector; 24, WDM; 3. Rayleigh scattering enhanced fiber (RSEF).

DESCRIPTION OF EMBODIMENTS

Here, exemplary embodiments will be described in detail, examples of which are shown in the accompanying drawings. When the following description refers to the drawings, unless otherwise indicated, the same numbers in different drawings indicate the same or similar elements. The embodiments described in the following exemplary embodiments do not represent all the embodiments consistent with this application.

The terminology used in this application is for the purpose of describing specific embodiments only, and is not intended to limit this application. The singular forms of "a", "said" and "the" used in this application and the appended claims are also intended to include many forms, unless the context clearly indicates other meaning. It should also be understood that the term "and/or" used herein refers to and includes any or all possible combinations of one or more associated listed items.

It should be understood that although the terms first, second, third, etc. may be used in this application to describe various kinds of information, this information should not be limited to these terms. These terms are only used to distinguish the same type of information from each other. For example, without departing from the scope of this application, the first piece of information can also be called the second piece of information, and similarly, the second piece of information can also be called the first piece of information. Depending on the context, the word "if" as used here can be interpreted as "when" or "at the time of" or "in response to a determination".

By making use of the characteristic that Rayleigh backscattering light generated by narrow linewidth and high coherence pulse injected into optical fiber is sensitive to external strain and temperature, DAS technology can realize distributed acoustic sensing along the sensing optical fiber by demodulating the phase or frequency change information of Rayleigh backscattering signal light. It has been widely used in oil and gas exploration, pipeline safety monitoring, marine seismic monitoring and other fields. At present, the commonly used DAS system principles include Φ-OTDR, COTDR and OFDR. These three technical solutions all use Rayleigh backscattering signals in optical fibers for sensing.

Due to the inherent loss limitation of optical fibers, the power of narrow-linewidth pulsed light will decrease exponentially after being injected into the optical fiber, leading to the result that the sensing distance of DAS system is usually only within 20 km. However, in border security, pipeline safety monitoring, seismic monitoring and other fields, the unrepeatered long-distance DAS system has greater practical application value.

High-order random fiber lasing amplification (RFLA) technology outputs the pump light by RFL to be injected into the sensing fiber. Distributed Rayleigh backscattering is used to provide feedback and stimulated Raman scattering is used to provide gain in the sensing fiber. Combined with the reflector which can provide point feedback, the cascaded random fiber lasing is generated. The generated random fiber lasing in the wavelength band of 1420 nm-1490 nm is used as the direct pump of 1.55 μm pulsed light, which acts with the pulsed light in the sensing fiber and provides gain for the pulsed light, thus realizing distributed RFLA along the sensing fiber.

Specifically, the present disclosure provides a DAS system based on RFLA and a RSEF, which includes a DAS demodulation unit, a high-order RFLA unit and a Rayleigh scattering enhanced fiber (RSEF). In an embodiment, the high-order RFLA unit includes a HRFL, an adjustable attenuator, a reflector and a WDM; pulsed light output by the DAS demodulation unit is injected into the Rayleigh scattering enhanced fiber (RSEF) by a reflection port of the WDM as probe light; after pump light output by the HRFL is injected into the Rayleigh scattering enhanced fiber (RSEF) by a pass port of the WDM, the HRFL and the reflector form a forward-pumped structure in the Rayleigh scattering enhanced fiber (RSEF), and cascaded random fiber lasings are generated by the combined action of stimulated Raman scattering gain and distributed backward feedback; the generated cascaded random fiber lasing is used as a direct pump to perform distributed amplification on the pulsed light, and enhanced backscattered signal light generated by the amplified pulsed light is returned to the DAS demodulation unit; the enhanced backscattered signal light is demodulated to implement long-distance distributed acoustic sensing with a high signal-to-noise ratio.

Figure 2:
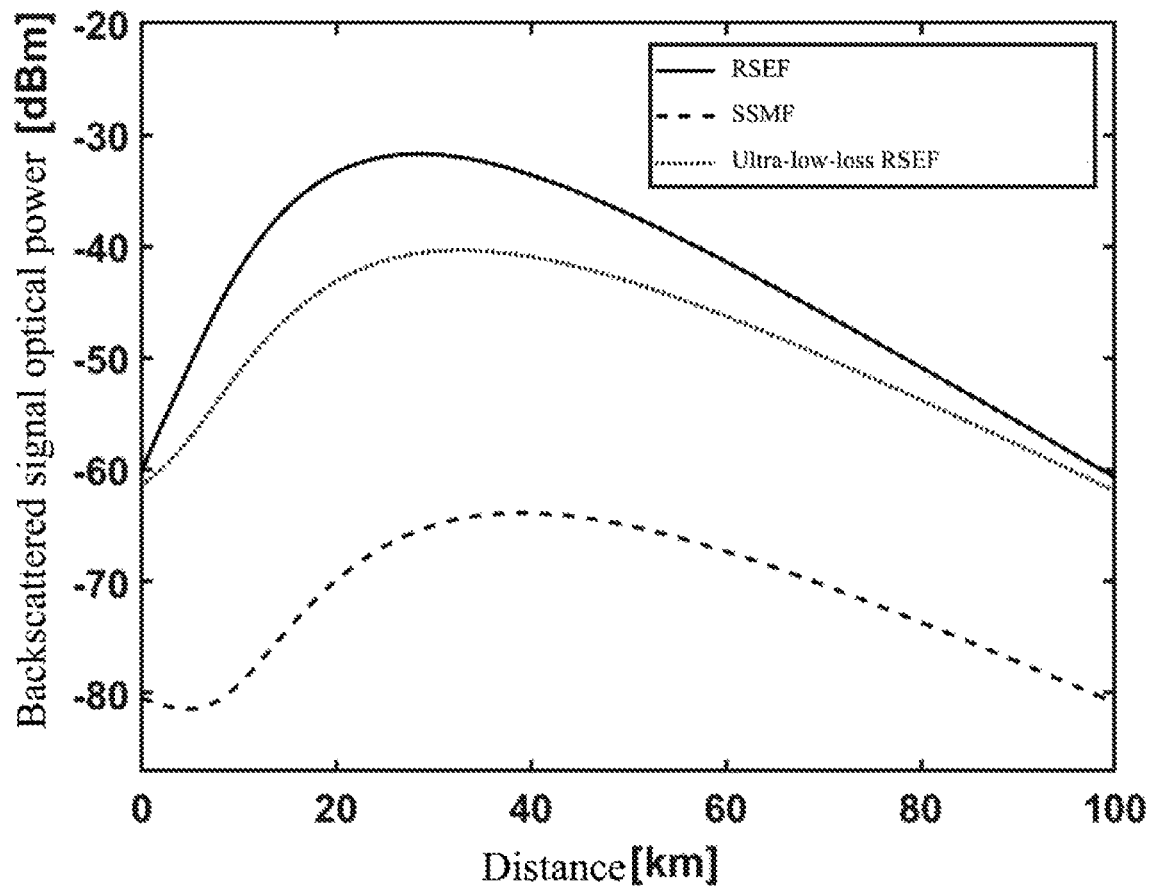
FIG. 2 is a comparative diagram of the power distribution of backscattered signals in a DAS system based on forward RFLA, which adopts a RSEF, a SSMF and an ultra-low-loss RSEF, respectively, according to an exemplary embodiment.

Specifically, as shown in FIG. 2, the high-order RFLA unit 2 includes a HRFL 201, an adjustable attenuator 202, a reflector 203 and a WDM 204. The HRFL 201 combined with the adjustable attenuator 202 can realize any adjustable output of the pump power. In the concrete implementation, the HRFL 201 can be a third-order RFL pump (the wavelength range can be 1.24 μm-1.29 μm) or a second-order RFL pump (the wavelength range can be 1.33 μm-1.38 μm), and its output power is adjusted by the adjustable attenuator 202. The pump structure formed by the reflector 203 and the HRFL 201 is used to generate cascaded random fiber lasing under the combined action of stimulated Raman scattering and distributed backward feedback in the scattering-enhanced sensing optical fiber 3. Through continuous cascaded conversion, the random fiber lasing in the 1.42 μm-1.49 μm band is generated, which is used as the direct pump of the 1.55 μm pulsed light for distributed amplification. The reflector 203 can be a single or multiple FBGs, or a broadband reflector for providing feedback for cascaded random fiber lasing. The reflector 203 is used to provide feedback for cascaded random fiber lasing under the action of the HRFL 201 cascaded. The output ends of the HRFL 201, the reflector 203 and the DAS demodulation unit 1 are all connected to the Rayleigh scattering enhanced fiber (RSEF) 3 by the WDM 204. In the Rayleigh scattering enhanced fiber (RSEF) 3, the high-order RFLA unit 2 generates cascaded random fiber lasing through the forward-pumped structure. The generated 1.42 μm-1.49 μm random fiber lasing is used as the direct pump of 1.55 μm pulsed light in the Rayleigh scattering enhanced fiber (RSEF) 3, which performs distributed amplification on the pulsed light along the Rayleigh scattering enhanced fiber (RSEF) 3 and prolongs the sensing distance of the DAS system. The wavelength of the pulse is 1.55 μm because the narrow line width light source used in the existing DAS system generally has an output wavelength of 1550.12 nm. Pump and cascaded random fiber lasing can amplify signal light of 1550.12 nm in the above wavelength range.

Specifically, taking the second-order RFL pumping as an example, the HRFL 201 outputs a 1.36 μm lasing to be injected into the optical fiber (as the pump), and under the pump action, stimulated Raman scattering (as the gain) is generated in the optical fiber. The reflector 203 provides feedback for the 1.46 μm lasing, which is combined with the backscattering in the optical fiber (constituting the resonance condition), so as to meet the three elements of lasing and generate 1.46 μm random fiber lasing in the optical fiber. Furthermore, the 1.46 μm random fiber lasing is used as a pump to excite stimulated Raman scattering (gain) in the optical fiber.

In the concrete implementation, the output power of the HRFL 201 is more than 500 mW, which is used to meet the threshold condition of high-order RFLA, and the relative intensity noise is less than <−115 dB/Hz, which is about 15 dB lower than that of the existing commercial Raman fiber laser pump in the same wavelength band, so that the low-noise high-order RFLA can be realized.

In practical implementation, the HRFL 201 combined with the adjustable attenuator 202 can realize any adjustable output of pump power. The reflector 203 can be a single or multiple FBGs, or a broadband reflector for providing feedback for cascaded Stokes light.

Specifically, the Rayleigh scattering enhanced fiber (RSEF) 3 can adopt a continuous or discrete femtosecond laser writing method to achieve full-band scattering enhancement, and can also adopt a continuous or discrete FBG writing method to achieve specific-band scattering enhancement. Because the FBG only provides feedback to a specific wavelength lightwave, which is different from the RSEF written in the optical fiber, the Rayleigh scattering enhanced fiber (RSEF) 3 made of a femtosecond laser can realize the backscattering enhancement effect of the full-band lightwave by adjusting the internal refractive index of the optical fiber. After the weak reflection point is written by the femtosecond laser, all the light waves of 1 µm-1.6 µm will be reflected when they pass through the weak reflection point, and the reflectivity is higher than the Rayleigh backscattering intensity, that is, scattering enhancement. In the DAS system, the Rayleigh scattering enhanced fiber (RSEF) 3 made of a femtosecond laser can not only improve the backward scattering intensity of 1.55 µm pulsed light, but also improve the backscattering intensity of HRFL pump and cascaded random fiber lasing. However, the method of writing the FBG generally only reflects the probe pulsed light in the limited wavelength range of 1.55 µm band, and the light waves in other bands are normally transmitted when they pass through the FBG, that is, corresponding to the present disclosure, only the 1.55 µm probe pulsed light is scattered and enhanced, and there is no enhancement effect on the pump light and cascaded random lasers.

Therefore, preferably, in the present disclosure, the full-band Rayleigh scattering enhanced fiber (RSEF) made of a femtosecond laser is used to replace the SSMF commonly used in the existing DAS system, which can not only improve the backscattering coefficient of signal light, but also improve the backscattering coefficient of amplification pump and cascaded random fiber lasing, and reduce the lasing threshold power of the cascaded random fiber lasing, so that the present disclosure can realize high-efficiency RFLA, and at the same time, improve the backscattered signal power of the amplified pulse light, overcome the problem that the probe pulsed light power is weak due to the small backscattered coefficient of the SSMF, and realize the signal-to-noise ratio and performance improvement of the detection signal of DAS system.

The Rayleigh scattering enhanced fiber (RSEF) 3 can be made based on a SSMF, a FMF, an ULLF or an ULLF-LEAF. The ULLF is generally made of a pure silicon core, and its transmission loss is lower than that of SSMF, generally <0.165 dB/km. At the same time, the Rayleigh backscattering coefficient of the ULLF is lower than that of SSMF. In addition, because stimulated Raman scattering is related to optical fiber materials, the Raman gain coefficient of the ULLF is lower than that of SSMF. In the scattering-enhanced optical fiber, the transmission loss of the scattering-enhanced optical fiber is higher than that of the SSMF due to the introduction of the microstructure made by femtosecond laser and the improved backscattering coefficient. Therefore, in this application, the RSEF is preferably made based on the ULLF, which can improve the backscattering coefficient of the sensing optical fiber and reduce the transmission loss of the sensing optical fiber.

The features and performances of the present disclosure will be further described in detail with reference to the following examples.

Example 1

When the high-order RFLA unit 2 and the DAS demodulation unit 1 are located at the same end of the Rayleigh scattering enhanced fiber (RSEF) 3, a DAS system structure based on forward-pumped RFLA and a RSEF is formed, as shown in FIG. 1. In the DAS system structure based on forward-pumped RFLA and a RSEF, the DAS demodulation unit 1, the high-order RFLA unit 2 and the Rayleigh scattering enhanced fiber (RSEF) 3 are connected in sequence. After the pump light output by the high-order RFLA unit 2 enters the Rayleigh scattering enhanced fiber (RSEF) 3 from the front end of the optical fiber link, the stimulated Raman scattering gain and the enhanced distributed backward feedback in the Rayleigh scattering enhanced fiber (RSEF) 3 are firstly utilized, and by combining the point feedback provided by the reflector 203, a half-open cavity forward-pumped structure is formed to generate cascaded random fiber lasing, and the generated cascaded random fiber lasing with a low threshold are further used as the direct pump of signal light. The stimulated Raman scattering gain in the Rayleigh scattering enhanced fiber (RSEF) 3 is used to perform forward distributed RFLA on the signal light output by the DAS demodulation unit 1. Specifically, the following steps are included:

Step a1, the DAS demodulation unit 1 outputs pulsed light, which is injected into the Rayleigh scattering enhanced fiber (RSEF) 3 through the WDM 204; the pump light output by the HRFL 201 through the adjustable attenuator 202 enters the WDM 204 and is injected into the Rayleigh scattering enhanced fiber (RSEF) 3; when the power of the HRFL 201 adjusted by the adjustable attenuator 202 reaches the cascaded random fiber lasing threshold, skip to step b1;

Step b1, a forward-pumped structure is formed by a HRFL 201 and a reflector 203, and cascaded random fiber lasings are generated by the combined action of stimulated Raman scattering gain, distributed backward feedback and point feedback provided by the reflector 203 in the Rayleigh scattering enhanced fiber (RSEF) 3, and skip to c1;

Step c1, cascaded random fiber lasing within a wavelength band of 1420 nm-1490 nm is used as a direct pump to perform distributed amplification on the pulsed light in the link of the Rayleigh scattering enhanced fiber (RSEF) 3, and skip to step D1;

Specifically, because the backscattering coefficient of the Rayleigh scattering enhanced fiber (RSEF) 3 is higher than that of the SSMF, the 1.45 µm cascaded random fiber lasing in the link of the Rayleigh scattering enhanced fiber (RSEF) 3 can efficiently amplify the pulsed light distributedly.

Step d1: the enhanced backscattered signal light generated by the amplified pulsed light returns to the DAS demodulation unit 1, which demodulates the backscattered signal light to implement long-distance distributed acoustic sensing.

In the concrete implementation, considering the solution of using the second-order RFLA combined with the Rayleigh scattering enhanced fiber (RSEF) 3 with the backscattering coefficient enhanced by 20 dB, when the output power of the 1365 nm HRFL 201 reaches 1.37 W, the power distribution of the amplified backscattered Rayleigh signal is shown by the solid line in FIG. 2. In contrast, in the SSMF, when the power of the 1365 nm HRFL 201 reaches 1.37 W, the power distribution of the amplified Rayleigh backscattering signal is shown by the dotted line in FIG. 2. It can be seen from FIG. 2 that the amplification efficiency of the high-order RFLA unit 2 can be significantly improved by using the Rayleigh scattering enhanced fiber (RSEF) 3.

Further, the Rayleigh scattering enhanced fiber (RSEF) 3 is replaced by an ultra-low-loss Rayleigh scattering enhanced fiber (RSEF). When the output power of the 1365 nm HRFL 201 is 1.58 W, the power distribution of the amplified backscattered signal is shown in dotted line in FIG. 2. It can be seen that the ultra-low-loss Rayleigh enhanced sensing optical fiber can improve the power of backscattered signal and realize a DAS system with flatter power distribution.

Example 2

Figure 3:
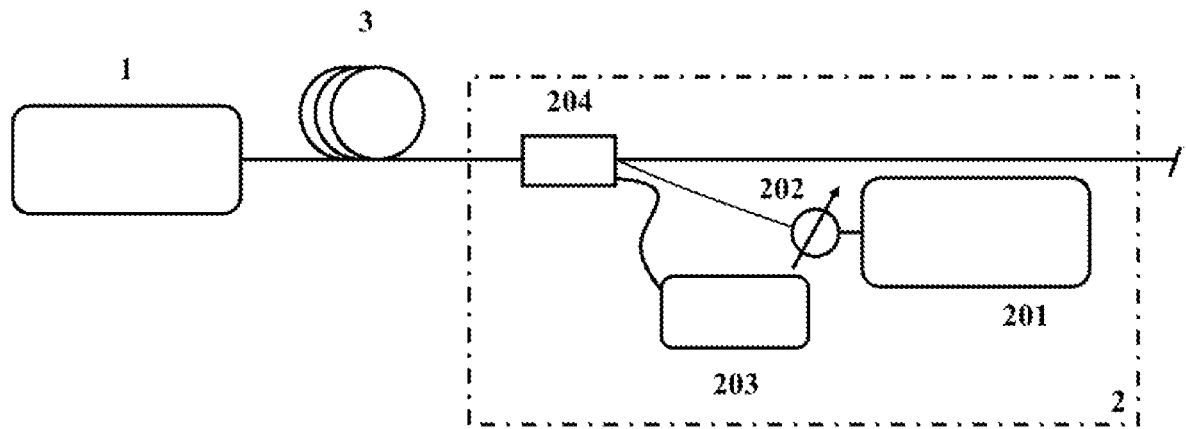
FIG. 3 is a schematic diagram of a DAS system based on backward RFLA and a RSEF according to an exemplary embodiment.

When the high-order RFLA unit 2 and the DAS demodulation unit 1 are located at the far end of the Rayleigh scattering enhanced fiber (RSEF) 3, a DAS system structure based on backward-pumped RFLA and a scattering enhanced optical fiber is formed, as shown in FIG. 3. In the DAS system structure based on backward-pumped RFLA and a scattering enhanced optical fiber, the DAS demodulation unit 1, Rayleigh scattering enhanced fiber (RSEF) 3 and high-order RFLA unit 2 are connected in sequence. After the high-order RFLA unit 2 enters the Rayleigh scattering enhanced fiber (RSEF) 3 from the far end of the optical fiber link, the stimulated Raman scattering gain and enhanced distributed backward feedback in the Rayleigh scattering enhanced fiber (RSEF) 3 are firstly utilized, and by combining the point feedback provided by the reflector 203, a half-open cavity forward-pumped structure is formed to generate cascaded random fiber lasing. The generated cascaded random fiber lasing with a low threshold is further used as the direct pump of signal light, and the stimulated Raman scattering gain in the Rayleigh scattering enhanced fiber (RSEF) 3 is used to perform backward-pumped distributed RFLA on the signal light output by the DAS demodulation unit 1. Specifically, the following steps are included:

Step a2, the pulsed light output by the DAS demodulation unit 1 is directly injected into the Rayleigh scattering enhanced fiber (RSEF) 3; the high-order random lasing pump output by the HRFL 201 through the adjustable attenuator 202 enters the WDM 204 to inject into the far end of the Rayleigh scattering enhanced fiber (RSEF) 3; when the power of the HRFL 201 adjusted by the adjustable attenuator 202 reaches the cascaded random fiber lasing threshold, skip to step B2;

Step b2, the HRFL 201 and the reflector 203 form a backward-pumped structure, and cascaded random fiber lasings are generated under the combined action of the stimulated Raman scattering gain, the distributed backward feedback and the point feedback provided by the reflector 203 in the Rayleigh scattering enhanced fiber (RSEF) 3, and skip to c2;

Step c2, the cascaded random fiber lasing in a wavelength band of 1420 nm-1490 nm is used as a direct pump to perform distributed amplification on the pulsed light in the link of the Rayleigh scattering enhanced fiber (RSEF) 3, and skip to d2;

Step d2, the enhanced backscattered signal light generated by the amplified pulsed light is returned to the DAS demodulation unit 1, and the DAS demodulation unit 1 demodulates the backscattered signal light to implement long-distance distributed acoustic sensing.

Figure 4:
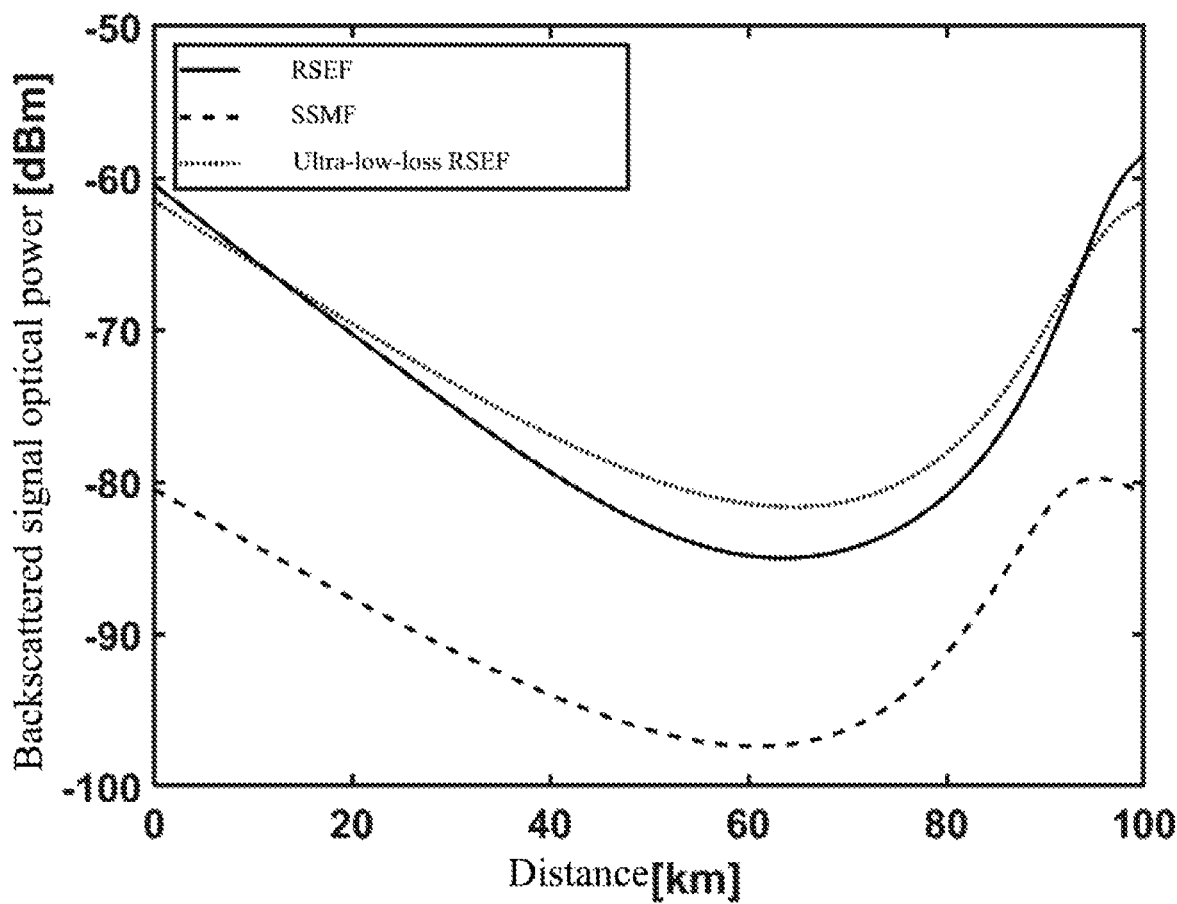
FIG. 4 is a comparative diagram of the power distribution of backscattered signals in a DAS system based on backward RFLA, which adopts a RSEF, a SSMF and an ultra-low-loss RSEF, respectively, according to an exemplary embodiment.

Considering the solution of using the second-order RFLA combined with the Rayleigh scattering enhanced fiber (RSEF) 3 with the backscattering coefficient enhanced by 20 dB, when the output power of 1365 nm HRFL 201 reaches 1.37 W, the power distribution of the amplified backscattered signal is shown by the solid line in FIG. 4. In contrast, in the SSMF, when the power of the 1365 nm HRFL 201 reaches 1.37 W, the power distribution of the amplified Rayleigh backscattering signal is shown by the dotted line in FIG. 4. It can be seen from FIG. 4 that the amplification efficiency of the high-order RFLA unit 2 can be significantly improved by using the Rayleigh scattering enhanced fiber (RSEF) 3.

Further, the Rayleigh scattering enhanced fiber (RSEF) 3 is replaced by an ultra-low loss Rayleigh scattering enhanced fiber (RSEF). When the output power of the 1365 nm HRFL 201 is 1.58 W, the power distribution of the amplified backscattered signal is shown in dotted line in FIG. 4. It can be seen that using ultra-low loss Rayleigh scattering enhanced fiber (RSEF) can improve the light intensity of backscattered signal and realize a DAS system with flatter power distribution.

Example 3

Figure 5:
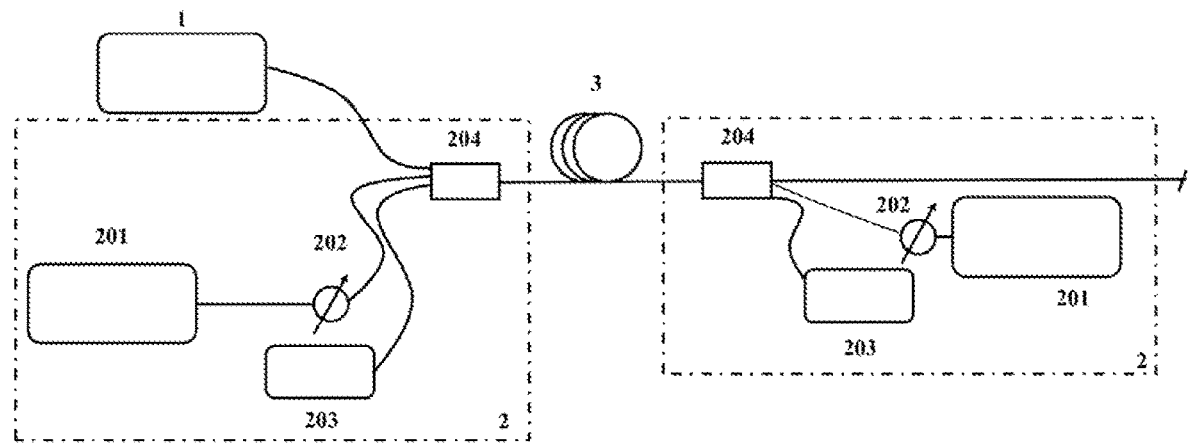
FIG. 5 is a schematic diagram of a distributed acoustic sensing system based on bidirectional RFLA and a RSEF according to an exemplary embodiment.

When two high-order RFLA units 2 are located at both ends of the Rayleigh scattering enhanced fiber (RSEF) 3, a DAS system structure based on b1-directional pumped RFLA and a RSEF is formed by combining the DAS demodulation unit 1, as shown in FIG. 5. The DAS system structure based on b1-directional pumped RFLA and a RSEF includes two high-order RFLA units 2. In an embodiment, one high-order RFLA unit 2 is connected with the front end of the Rayleigh scattering enhanced fiber (RSEF) 3, and the other high-order RFLA unit 2 is connected with the far end. After the two high-order RFLA units 2 enter the Rayleigh scattering enhanced fiber (RSEF) 3 from the front end and the far end of the optical fiber link respectively, the stimulated Raman scattering gain in the Rayleigh scattering enhanced fiber (RSEF) 3 and the enhanced distributed backward feedback are firstly utilized, and by combining the point feedback provided by the reflector 203, a half-open cavity forward-pumped structure is formed to generate cascaded random fiber lasings. The generated low-threshold cascaded random fiber lasing is further used as the direct pump of signal light, and the signal light output by the DAS demodulation unit 1 is amplified by the stimulated Raman scattering gain in the Rayleigh scattering enhanced fiber (RSEF) 3. Specifically, the following steps are included:

Step a3, the pulsed light output by the DAS demodulation unit 1 is injected into the Rayleigh scattering enhanced fiber (RSEF) 3 through the WDM 204; the two HRFLs 201 respectively output high-order random fiber lasings through the corresponding adjustable attenuators 202 and the random fiber lasings enter the corresponding WDMs 204, so as to be injected into the front end and the far end of the Rayleigh scattering enhanced fiber (RSEF) 3 respectively; when the power of the HRFLs 201 adjusted by the adjustable attenuators 202 reaches the cascaded random fiber lasing threshold, skip to step B3;

Step b3, a HRFL 201 and a reflector 203 form a forward-and-backward-pumped structure, and cascaded random fiber lasings are generated in the Rayleigh scattering enhanced fiber (RSEF) 3 under the combined action of stimulated Raman scattering gain, distributed backward feedback and point feedback provided by the reflector 203, and skip to c3;

Step c3, the first-order random fiber lasing in the wavelength band of 1420 nm-1490 nm is used as a direct pump to perform distributed amplification on the pulsed light in the link of the Rayleigh scattering enhanced fiber (RSEF) 3, and skip to d3;

Step d3: the enhanced backscattered signal light generated by the amplified pulsed light returns to the DAS demodulation unit 1, which demodulates the backscattered signal light to implement long-distance distributed acoustic sensing.

Figure 6:
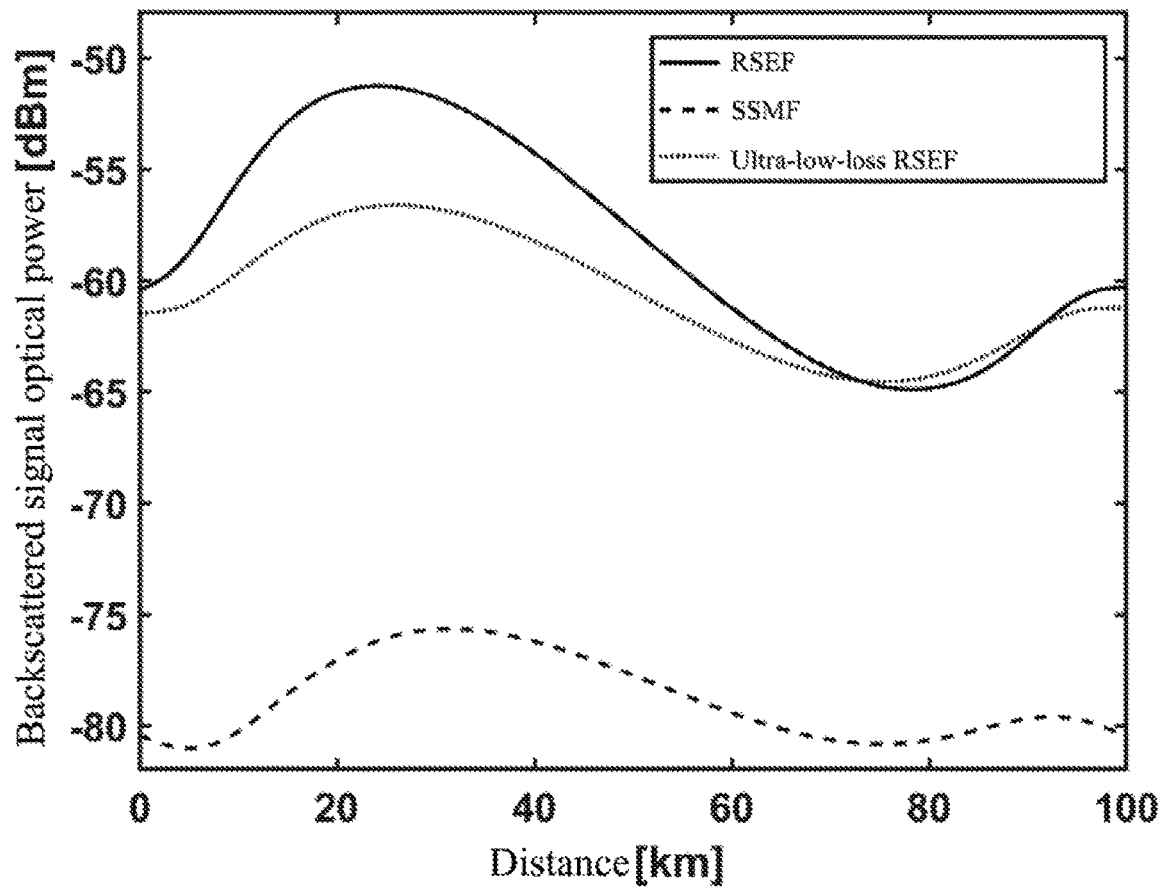
FIG. 6 is a comparative diagram of the optical power distribution of backscattered signals in a distributed acoustic sensing system based on bidirectional RFLA, which adopts a RSEF, a SSMF and an ultra-low-loss RSEF, respectively, according to an exemplary embodiment.

Considering the solution of using the second-order RFLA combined with the Rayleigh scattering enhanced fiber (RSEF) 3 with the backscattering coefficient enhanced by 20 dB, when the output power of the forward 1365 nm HRFL 201 reaches 1 W and the output power of the backward 1365 nm HRFL 201 reaches 0.89 W, the power distribution of the amplified backscattered signal is shown by the solid line in FIG. 6. In contrast, in the SSMF, when the power of the forward 1365 nm HRFL 201 reaches 0.9 W and the power of the backward 1365 nm HRFL 201 reaches 0.74 W, the power distribution of the amplified backscattered signal is shown by the dotted line in FIG. 6. It can be seen from FIG. 6 that the amplification efficiency of the high-order RFLA unit 2 can be significantly improved by using the Rayleigh scattering enhanced fiber (RSEF) 3.

Further, the Rayleigh scattering enhanced fiber (RSEF) 3 is replaced by an ultra-low loss Rayleigh scattering enhanced fiber (RSEF). When the output power of the front 1365 nm HRFL 201 is 1.1 W and the output power of the backward 1365 nm HRFL 201 reaches 1.05 W, the optical power distribution of the amplified backscattered signal is shown by dotted lines in FIG. 6. It can be seen that using ultra-low loss Rayleigh scattering enhanced fiber (RSEF) can improve the light intensity of backscattered signal and realize a DAS system with flatter power distribution.

To sum up, the DAS system and method based on high-order RFLA and a RSEF provided by the present disclosure can improve the optical power of backscattered signal by taking advantage of high-order RFLA and full-band Rayleigh scattering enhanced fiber (RSEF). Further, the ultra-low loss RSEF can realize long-distance and high-performance sensing with less signal power variation, so as to meet the present disclosure requirements of longer-distance sensing.

Those skilled in the art will easily think of other embodiments of this application after considering the specification and practicing the contents disclosed herein. This application is intended to cover any variations, uses or adaptations of this application, which follow the general principles of this application and include common knowledge or common technical means in the technical field not disclosed in this application.

It should be understood that this application is not limited to the precise structure described above and shown in the drawings, and various modifications and changes can be made without departing from its scope.

What is claimed is:

1. A distributed acoustic sensing (DAS) system based on random fiber lasing amplification (RFLA) and a Rayleigh scattering enhanced fiber (RSEF), comprising an DAS demodulation unit, a high-order random fiber lasing amplification (RFLA) unit and a RSEF, wherein the high-order RFLA unit comprises a high-order random fiber laser (HRFL), an adjustable attenuator, a reflector and a wavelength division multiplexer (WDM); pulsed light output by the DAS demodulation unit is injected into the RSEF by a reflection end of the WDM as detection signal light; after pump light output by the HRFL is injected into the RSEF by a pass port of the WDM, the HRFL and the reflector form a pumping structure in the RSEF, and cascaded random fiber lasing is generated by stimulated Raman scattering gain combined with distributed backward feedback; the generated cascaded random fiber lasing is configured to perform distributed amplification on the pulsed light, and enhanced backscattered signal light generated by the amplified pulsed light returns to the DAS demodulation unit; and the enhanced backscattered signal light is demodulated to implement long-distance distributed acoustic sensing with a high signal-to-noise ratio.

2. The DAS system based on the random laser amplification and the RSEF according to claim 1, wherein the DAS demodulation unit demodulates the enhanced backscattered signal light by phase-sensitive optical time-domain reflectometry (Φ-OTDR), coherent optical time-domain reflectometry (COTDR) or optical frequency-domain reflectometry (OFDR) demodulation principle.

3. The DAS system based on the random laser amplification and the RSEF according to claim 1, wherein the RSEF adopts a continuous or discrete femtosecond laser writing method to enhance full-band scattering, or adopts a continuous or discrete fiber Bragg grating (FBG) writing method to enhance specific-band scattering.

4. The DAS system based on the random laser amplification and the RSEF according to claim 1, wherein an output power of the HRFL is greater than 500 mW, and a relative intensity noise of the HRFL is less than −115 dB/Hz.

5. The DAS system based on the random laser amplification and the RSEF according to claim 1, wherein the HRFL combined with the adjustable attenuator can realize any adjustable pump power.

6. The DAS system based on the random laser amplification and the RSEF according to claim 1, wherein the reflector is a single or multiple FBGs, or a broadband reflector is configured to provide feedback for cascaded Stokes light.

7. The DAS system based on the random laser amplification and the RSEF according to claim 1, wherein the RSEF is made based on a standard single-mode fiber (SSMF), a few-mode fiber (FMF), an ultra-low-loss fiber (ULLF) or an ultra-low-loss large-effective-area fiber (ULL-LEAF).

8. The DAS system based on the random laser amplification and the RSEF according to claim 1, wherein the DAS demodulation unit, the high-order random laser amplification unit and the RSEF are connected in sequence, the DAS demodulation unit outputs the pulsed light, the pulsed light is injected into the RSEF by the WDM; the HRFL outputs the pump light into the WDM by the adjustable attenuator to be injected into the RSEF; when a power of the HRFL adjusted by the adjustable attenuator reaches a cascaded random fiber lasing threshold, the HRFL and the reflector form a forward-pumped structure, and the cascaded random fiber lasings are generated in the scattering enhanced sensing fiber by the stimulated Raman scattering gain combined with the distributed backward feedback and point feedback provided by the reflector; a cascaded random fiber lasing in a wavelength band of 1420 nm-1490 nm is configured as a direct pump to perform distributed amplification on the pulsed light in a link of the RSEF, and the enhanced backscattered signal light generated by the amplified pulsed light returns to the DAS demodulation unit; and the DAS demodulation unit demodulates the enhanced backscattered signal light to implement long-distance distributed acoustic sensing.

9. The DAS system based on the random laser amplification and the RSEF according to claim 1, wherein the DAS demodulation unit, the RSEF and the high-order random laser amplification unit are connected in sequence, and the pulsed light output by the DAS demodulation unit is directly injected into the RSEF; the HRFL outputs high-order random lasing into the WDM by the adjustable attenuator to be injected into a far end of the RSEF; when a power of the HRFL adjusted by the adjustable attenuator reaches a cascaded random fiber lasing threshold, the HRFL and the reflector form a backward-pumped structure, and a cascaded random fiber lasing is generated in the scattering enhanced sensing fiber by stimulated Raman scattering gain combined with distributed backward feedback and point feedback provided by the reflector; a cascaded random fiber lasing in a wavelength band of 1420 nm-1490 nm is configured as a direct pump to perform distributed amplification on the pulsed light in a link of the RSEF, and the enhanced backscattered signal light generated by the amplified pulsed light returns to the DAS demodulation unit; and the DAS demodulation unit demodulates the enhanced backscattered signal light to implement long-distance distributed acoustic sensing.

10. The DAS system based on the random laser amplification and the RSEF according to claim 1, comprising two high-order random laser amplification units, wherein one of the high-order random laser amplification units is connected with a front end of the RSEF, and the other one of the high-order random laser amplification unit is connected with a far end of the RSEF; the pulsed light output by the DAS demodulation unit is injected into the RSEF by the WDM; high-order random fiber lasings are output by two HRFLs into corresponding WDMs through corresponding adjustable attenuators, respectively, and is injected into the front end and the far end of the RSEF, respectively; when a power of the HRFL adjusted by the adjustable attenuator reaches a cascaded random fiber lasing threshold, the HRFL and the reflector form forward-and-backward-pumped structures, and a cascaded random fiber lasing is generated in the RSEF by stimulated Raman scattering gain combined with distributed backward feedback and point feedback provided by the reflector; a cascaded random fiber lasing in a wavelength band of 1420 nm-1490 nm is configured as a direct pump to perform distributed amplification on the pulsed light in a link of the RSEF, and the enhanced backscattered signal light generated by the amplified pulsed light returns to the DAS demodulation unit; and the DAS demodulation unit demodulates the enhanced backscattered signal light to implement long-distance distributed acoustic sensing.

* * * * *